(12) United States Patent
Anand et al.

(10) Patent No.: US 11,442,750 B2
(45) Date of Patent: Sep. 13, 2022

(54) METADATA DRIVEN USER INTERFACE TEST AND VALIDATION SYSTEM

(71) Applicant: SAP SE, Walldorf (DE)

(72) Inventors: Ashish Anand, Bangalore (IN); Ashish Jain, Bangalore (IN); Reshma R Varma, Bangalore (IN); Rohit Chaudhary, Bangalore (IN); Prakash Kumar, Bangalore (IN); Rishabh Sawa, Bangalore (IN); Suneet Agarwal, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/862,677

(22) Filed: Apr. 30, 2020

(65) Prior Publication Data

US 2021/0342167 A1    Nov. 4, 2021

(51) Int. Cl.
G06F 9/451     (2018.01)
G06F 9/4401    (2018.01)
G06F 11/30     (2006.01)

(52) U.S. Cl.
CPC ............ *G06F 9/451* (2018.02); *G06F 9/4411* (2013.01); *G06F 11/3086* (2013.01); *G06F 11/3093* (2013.01)

(58) Field of Classification Search
None
See application file for complete search history.

(56) References Cited

U.S. PATENT DOCUMENTS

| | | | | |
|---|---|---|---|---|
| 2005/0223360 A1* | 10/2005 | Seeman | ............. | G06F 11/3688 717/124 |
| 2007/0294586 A1* | 12/2007 | Parvathy | ............. | G06F 11/3672 714/38.14 |
| 2011/0088018 A1* | 4/2011 | Foley | ................. | G06F 11/3684 717/131 |
| 2013/0212703 A1* | 8/2013 | Ramesh | ........... | G06Q 10/06393 726/28 |
| 2017/0329581 A1* | 11/2017 | Jann | ......................... | G06F 8/38 |

* cited by examiner

*Primary Examiner* — Stella Higgs
(74) *Attorney, Agent, or Firm* — Sterne, Kessler, Goldstein & Fox P.L.L.C.

(57) ABSTRACT

Various embodiments for providing a user interface test and validation system are described herein. An embodiment operates by determining user interface (UI) settings and metadata, and fetching data corresponding to the metadata. A plurality of test procedures corresponding to the UI element are identified. A plurality of states to be present in a rendering of the UI element based on the plurality of test procedures, the metadata, and the data are identified. A rendering of the UI element is validated against the plurality of states. A test report is provided based on the validating.

20 Claims, 4 Drawing Sheets

| Book Sellers LLC Top Books | | | |
|---|---|---|---|
| ID | Author | Title | Stock |
| 1495 | W. Shakespeare | Romeo & Juliet | 12 |
| 5499 | The Raven | E. Poe | 9 |
| 20 | N. Hill | Think and Grow Rich | 6339 |
| 7934 | | Harry Potter | 12 |

— 406

Test Report

| Test | Result | Expected Value | Notes |
|---|---|---|---|
| Heading | Pass | Book Seller LLC | |
| Sub-heading | Pass | Top Books | |
| ID | Fail | 6339 | Displayed Value: "20" |
| Author | Fail | E. Poe | Displayed Value: "The Raven" |
| Title | Fail | The Raven | Displayed Value: "E. Poe" |
| Stock | Fail | 20 | Displayed Value: "6339" |
| Author | Fail | "J. K. Rowling" | No Value Displayed |
| Title | Pass | Harry Potter | |

— 430

Book Sellers LLC
Top Books — 406

| ID | Author | Title | Stock |
|---|---|---|---|
| 1495 | W. Shakespeare | Romeo & Juliet | 12 |
| 5499 | The Raven | E. Poe | 9 |
| 20 | N. Hill | Think and Grow Rich | 6339 |
| 7934 | | Harry Potter | 12 |

FIG. 4A

Test Report — 430

| Test | Result | Expected Value | Notes |
|---|---|---|---|
| Heading | Pass | Book Seller LLC | |
| Sub-heading | Pass | Top Books | |
| ID | Fail | 6339 | Displayed Value: "20" |
| Author | Fail | E. Poe | Displayed Value: "The Raven" |
| Title | Fail | The Raven | Displayed Value: "E. Poe" |
| Stock | Fail | 20 | Displayed Value: "6339" |
| Author | Fail | "J. K. Rowling" | No Value Displayed |
| Title | Pass | Harry Potter | |

FIG. 4B

METADATA DRIVEN USER INTERFACE TEST AND VALIDATION SYSTEM

BACKGROUND

When a user interface (UI) for an application is developed or modified, it is often useful and important that the UI is tested to make sure everything appears as it is intended and is functional. Failure to test the UI can result in massive disruptions in user productivity and increased user dissatisfaction. However, writing test scripts for all the varying combinations of functionality and visual settings that need to be tested is both time intensive for developers and prone to errors, in which some functionality and/or visual settings are not tested and missed due to human error.

BRIEF DESCRIPTION OF THE DRAWINGS

The accompanying drawings are incorporated herein and form a part of the specification.

FIG. 4A is a block diagram illustrating an example user interface, according to some embodiments.

FIG. 4B is a block diagram illustrating an example test report, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a providing a user interface test and validation system.

When a user interface (UI) for an application is developed or modified, it is often useful and important that the UI is tested to make sure everything appears as it is intended and is functional. Failure to test the UI can result in massive disruptions in user productivity and increased user dissatisfaction. However, writing test scripts for all the varying combinations of functionality and visual settings that need to be tested is both time intensive for developers and prone to errors, in which some functionality and/or visual settings are not tested and missed due to human error.

Figure 1:
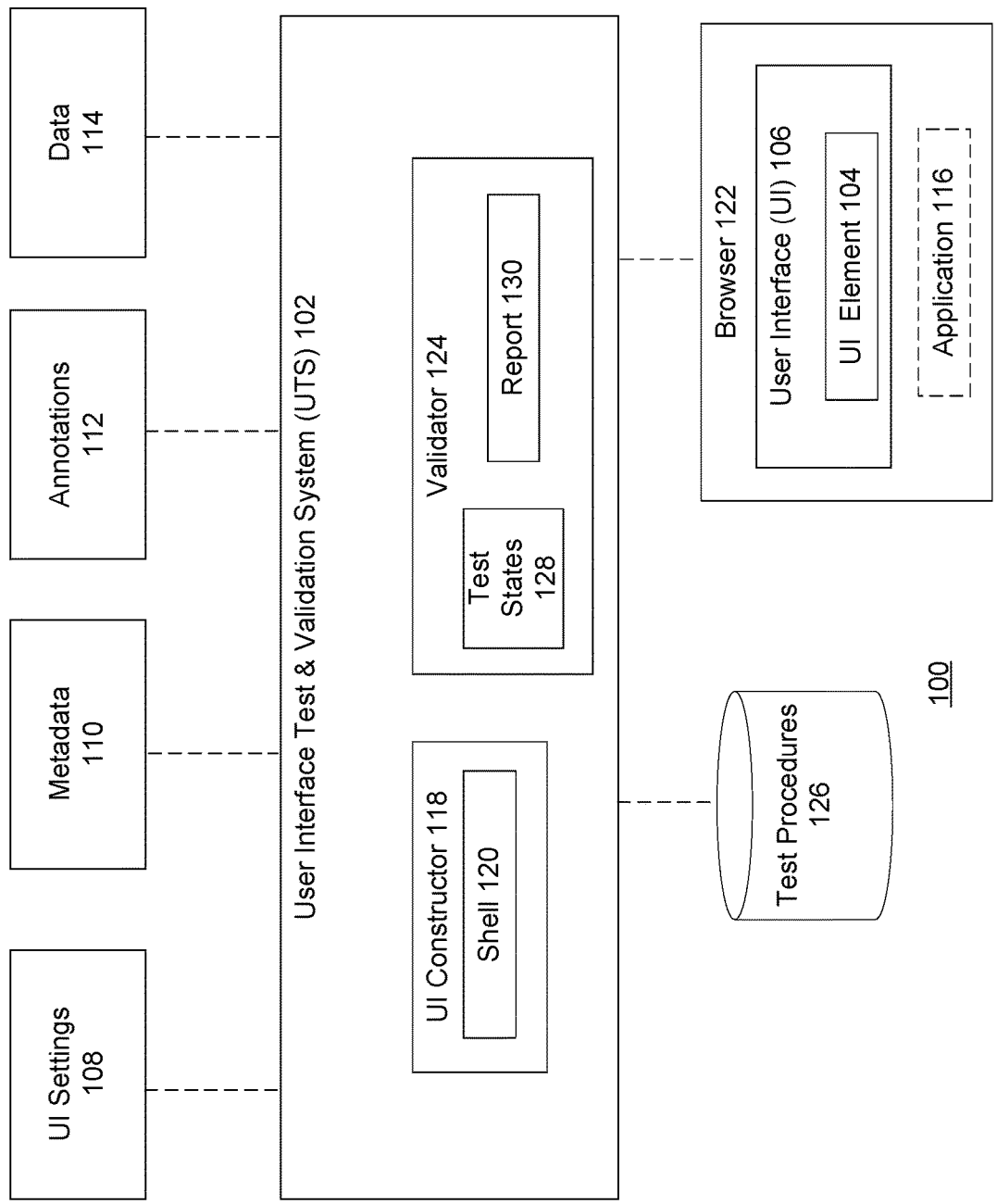
FIG. 1 is a block diagram illustrating example functionality for providing a user interface test and validation system, according to some embodiments.

FIG. 1 is a block diagram 100 illustrating example functionality for providing a user interface test and validation system (UTS) 102, according to some embodiments. UTS 102 may enable automatic testing of the display and/or functionality of user interfaces without requiring a developer to write code or test scripts for newly designed or modified UIs.

UTS 102 may use user or developer provided information used to generate the interface to automatically generate test scripts for testing a user interface (UI) 106. UI 106 may include any different number of UI elements 104. UI elements 104 may include any visual features that are intended to or do visually appear on a UI 106. Some example UI elements 104 include titles, buttons, graphs, charts, images, statistics, etc. For simplicity, only one UI element 104 is illustrated in UI 106, however UI 106 may include any number of UI elements 104 of varying types.

UTS 102 may enable a testing and validation of UI elements 104 during a design time of application development without requiring a test engineer to manually design and code a test script for validating the functionality of the UI elements 104. The manual design and coding of test scripts can be a time consuming and resource intensive process that is subject to human error from not testing various aspects, features, or functionality of the UI element 104.

A test engineer may be required to manually identify what portions of a user interface (e.g., title, subtitle) are to be tested, and what data is to appear in those portions. This manual process may include writing some automation test code using different available frameworks. Then testing and compiling the automation code to ensure every feature has been tested. This requires both time and computing resources. Also for each new update or iteration, or every new application, the test engineer may need to perform this process again and again prior to release. Furthermore, relying on a test engineer opens new releases to the variabilities involved in the experience or skillset of whatever test engineer is testing the interface.

UTS 102, as described herein, relieves a test engineer from manually determining what needs to be tested, and either manually testing an interface or writing test code for automated testing. This may both shorten the lifecycle and reduce the amount of effort required for new releases and updates, while improving the fullness of the testing.

In an embodiment, a UI constructor 118 may be an application or program that enables users to design user interfaces 106 with varying UI elements 104 without requiring the user to drag-and-drop elements into an interface builder and without programming long strings of code. Instead, UI constructor 118 may enable a user to provide various information such as a set of UI settings 108, with various personalized or customized annotations 112, and metadata 110 for organizing and accessing the data 114, and may automatically build the corresponding UI 106 structure and UI element(s) 104.

Rather than requiring a developer or test engineer to then write code for a UI 106 that was developed without requiring a UI developer to write code, UTS 102 uses the information used to develop UI 106 (e.g., UI settings 108, metadata 110, annotations 112, and data 114) to automatically generate test scripts and test states 128 for ensuring the generated or rendered UI 106 and UI element 104 correspond to the input information. UTS 102 may ensure that what is actually displayed on a rendering of UI 106 corresponds to what was intended to be displayed on the rendering of UI 106, as determined by the provided information.

In an embodiment, in designing a UI 106, a UI designer may provide or make available a set of UI settings 108. UI settings 108 may be any general settings indicating a size, shape, position, or type of UI element 104. For example, UI settings 108 may indicate that a chart with the title "Sales for 2020" is to be displayed, and may point to the metadata 110 and data 114 that are going to be used to fill in the chart, and any configurations or annotations 112 specific to that chart. In an embodiment, UI settings 108 may indicate which metadata 110, annotations 112, and data 114 are to be used for UI 106 and/or UI element 104. For example, UI settings may indicate address paths where the metadata 110, annotations 112, and data 114 may be stored or located. In an embodiment, UI settings 108 may include a title, label, font or other physical appearance of images and/or words within UI element 104.

In an embodiment, UI settings 108 may indicate how many and of which type of UI elements 104 are to appear on UI 106, and their relative positioning within UI 106. Some example different UI elements 104 include a table, graph, chart, button, linked list, list, etc. This is not an exclusive list, and other embodiments, may include different UI elements.

In an embodiment, UI settings 108 may be created or submitted in a manifest or JavaScript Object Notation (JSON) file. JSON is one example of an open standard file format and data interchange format that uses human-readable text to store and transmit data objects. The UI settings 108 may be language independent. In other embodiments, other formats, other than JSON may be used.

Metadata 110 may be information that describes other data 114 that will be used to populate UI element 104. Metadata 110 provides information about a certain item's content. In an embodiment, metadata 110 may include information about the various records or rows of data 114. For example, for a collection of books, metadata 110 may contain information about what information is being received, such as title, author, copyright, publisher, summary, category, price, etc., for each book or record.

In an embodiment, metadata 110 may include attributes that may correspond to various columns in a table UI element 104. Or, for example, metadata 110 may indicate the horizontal and vertical labels of a graph, categories of a pie chart, etc. For example, for a bookseller, the metadata 110 may indicate attributes about books such as: quantity in stock, author name, title, category, and price.

In an embodiment, metadata may be provided using an open protocol that allows the creation and consumption of queryable and interoperable RESTful APIs (application programming interfaces) in a simple and standard way, such as by using Open Data Protocol (OData). REST may refer to Representational State Transfer (REST), which may be a style that defines a set of constraints used for created web services that provide for interoperability between computing systems on the internet, and may include a set of stateless operations.

Data 114 may be the actual information or values that correspond to metadata 110. In an embodiment, data 114 may be stored separately from metadata 110. Data 114 may include the actual formatted or organized data as retrieved from a file or database that corresponds to the metadata 110. For example, data 114 may include the actual book names, authors, prices, quantities, categories, etc.

Annotations 112 may be used to extend OData services. For example, by annotating a service, a user may add information that tells client devices how to interpret the service and its data. This additional information can be purely static and descriptive, or it can be dynamic, i.e. a "formula" that allows clients to compute new data from the data provided by the service. And annotations 112 can be provided by the service designer and embedded in the service's metadata 110, or it can be provided by someone else as a separate web resource that references the annotated service.

In an embodiment, annotations 112 may be used to enrich metadata 110. For example, while metadata may define the properties of the structure of data 114, annotations 112 may indicate which of those properties are visible on UI 106 across one or more of the UI elements 104. As used herein, the term metadata 110 may be used to describe both metadata 110 and corresponding annotations 112, which may either be stored together as part of a single file, or separately (as illustrated in FIG. 1).

In an embodiment, annotations 112 may include particular configurations or adaptations of a standard UI element 104 for use in a particular system or application 116. Application 116 may include a web-based interface or application that provides or makes data 114 available to one or more users. For example, a user may want to check to see if a particular book is available and in stock at the bookseller, using application 116, which may be accessed through user interface 106.

Annotations 112 may include indications as to which information or data 114 or UI elements 104 are available to which users, or during which times. For example, price or quantity information may not be available on particular days or to particular users. Annotations 112 may include any other user, system, or application 116 specific configurations to one of a standard set of UI elements 104.

A UI constructor 118 may generate a UI shell 120 from UI settings 108, metadata 110, and annotations 112. UI shell 120 may be an outline or skeleton of which standard UI element(s) 104 are to be displayed in UI 106, including their relative placements, their configurations or annotations 112, and the metadata 110 corresponding to the data to be used to fill in the shell 120. Shell 120 however may not include any actual data 114.

In an embodiment, a browser 122 may render UI 106 from shell 120 and data 114. Browser 122 may be an Internet Browser, or window of application 116, or another user interface renderer that enables a user to see and interact with UI 106.

A validator 124 may test and validate whether the UI 106 and/or UI elements 104 displayed in browser 122 correspond to what was intended to be displayed (based on UI settings 108, metadata 110, annotations, and data 114) without requiring a developer to write a specific or individual test script for UI 106 or UI element 104.

For example, as noted above, UI settings 108, metadata 110, annotations 112, and data 114 may include all of the information necessary to generate or render the intended or desired UI 106. However, because there can be gaps, missing information, or other flaws that may occur, it is possible that the actual rendered UI 106 does not match or correspond to what was intended, as indicated by the provided information. UTS 102 may automatically generate test scripts and test states 128 to verify whether the UI 106 that is rendered corresponds to the UI as was provided through the information.

In an embodiment, UI settings 108 may indicate which UI element 104 is to be displayed on UI 106. For example, UI 106 may be preconfigured to display any number of a closed set of UI elements, such as tables, graphs, pie charts, text blocks, etc. Each UI element 104 may provide a particular format and/or display of at least a portion of data 114.

With a known or closed set of possible UI elements 104, there may have been preconfigured or previously developed a set of test procedures 126. Test procedures 126 may be pre-defined, or pre-configured procedures for testing each of one or more UI elements 104, that take into account all of the various ways in which a user may configure the UI element 104.

However, not all of the test procedures 126 for a particular UI element 104 may be applicable to how a particular user is using the UI element 104, based on the given information. A validator 124 may retrieve the test procedures 126 for the identified UI element 104, and identify which test scripts are to be applied to the particular uses of the UI element 104 given the provided set of information.

In an embodiment, validator 124 may generate a set of test states 128. Test states 128 may be indicators of what data 114 and features of UI element 104 should and/or should not be visible or tested in a rendered UI 106, including the various data elements 104, in browser 122. Validator 124 may compare test states 128 to an actual rendering or display of UI 106 in browser 122 and generate tests results or a report 130.

For example, the combination of test procedures 126 and test states 128 may indicate that the title of a table should read "Books for Sale." Validator 124 then test the actual or generated UI 106 to determine if the title of the UI element 104 (which may be a table) actually reads "Books for Sale". In an embodiment, validator 124 may ping or request what information is displayed from browser 122, or may be perform some optical character recognition (OCR) processes on the displayed UI 106. If what is displayed matches the test states 128, that may be a passed test, if there is a variance, the test may fail.

Validator 124 may generate a set of test results and write them into a test report 130. In an embodiment, the report 130 may indicate which tests were performed, the expected and actual results, whether the test was passed/failed, and where the information that was displayed or used to generate the test states 128 originated.

In an embodiment, report 130 may be a human-readable report that is provided to an engineer about how closely the actual rendering of UI 106 matched the test states 128, and which elements or tests passed/failed. Based on report 130, an engineer may identify and fix what is wrong, or may launch the UI 106 as part of application 116. Then, for example, when updates are made to any of UI settings 108, metadata 110, annotations 112, and/or data 114, the same testing process may be repeated, without requiring a developer to write a new test script.

In an embodiment, report 130 may indicate what data 114 was supposed to be visible in which UI element 104 (e.g., expected test states 128), and what data 114 was actually visible in the indicated UI element 104, in the case of failure. For example, if a table (UI element 104) was supposed to have the title "Top Books" and the UI element 104 in the rendering of UI 106 has the same title, then the report 130 may read: expected Title "Top Books"—Passed.

However, if the actual title in the rendering of UI element 104 was actually "Top Author", then report 130 may indicate: expected title for Table 1 "Top Books", detected title "Top Author"—Failed. Or, if there was no title for Table 1, the report 130 may indicate that the title was missing or not found (which may also be a failed test). A test engineer, upon seeing this report may then submit it to a development team which may need to then re-write or modify code to determine what may have caused the failure.

In an embodiment, UTS 102 may use the same metadata 110 (including annotations 112) and data 114 that are used to generate a UI 106 (based on an initial application manifest or UI settings 108) without requiring a UI developer to write UI specific code, to then test the UI 106. Using the metadata 110 (including annotations 112) and data 114 and UI settings 108, UTS 102 may automatically (without user input) identify test states 128 as to what data 114 should be visible in various UI elements 104 and how UI 106 should appear. UTS 102 may then test the UI 106, and UI elements 104, and generate a report 130 which may then be used by an engineer who may determine whether or not to release the UI 106 or how to fix the errors (if any). In an embodiment, if all the tests from report 130 are passed, report 130 may include a recommendation to release the UI 106.

Figure 2:
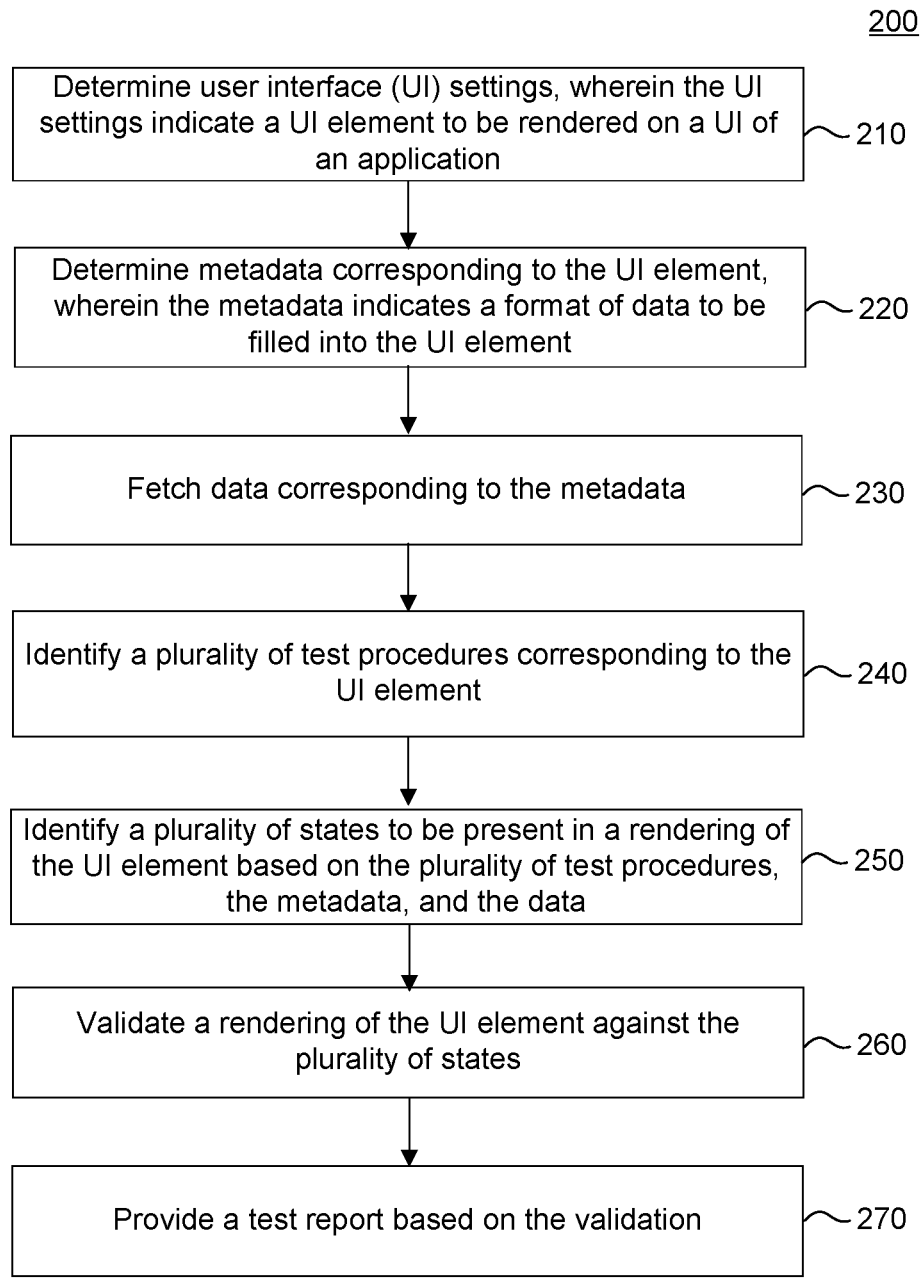
FIG. 2 is a flowchart illustrating example operations for providing a user interface test and validation system, according to some embodiments.

FIG. 2 is a flowchart 200 illustrating example operations for providing a user interface test and validation system, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1.

In 210, user interface (UI) settings indicating a UI element to be rendered on a UI of an application are determined. For example, UTS 102 may retrieve UI settings 108 from a particular device, such as a front-end server. The UI settings 108 may be stored in a manifest or JSON file. From the UI settings 108, UTS 102 may determine which UI element(s) 104 are to be created and tested in UI 106.

In 220, metadata corresponding to the UI element indicating a format of data to be filled into the UI element is determined. For example, UTS 102 may retrieve metadata 110 from a particular device, such as a backend server. Metadata 110 may include information about the data 114 that is going to be used to populate the UI element(s) 104. In an embodiment, UTS 102 may also retrieve annotations 112 from a backend server—which may be the same or different backend server storing metadata 110. Based on UI settings, metadata 110, and annotations 112, UI constructor 118 may generate a skeleton or shell 120 of the UI 106.

In 230, data corresponding to the metadata is fetched. For example, UTS 102 may retrieve data from a device, such as a backend server. The data 114 may be the actual data values used to populate the shell 120 in UI 106. In an embodiment, data 114 may be retrieved or fetched from a formatted or structured data file or database.

In 240, a plurality of test procedures corresponding to the UI element are identified. For example, UTS 102 may retrieve pre-configured or preconceived test procedures 126 which may cover all the possible test scenarios for a given UI element 104. The test procedures 126 for each UI element 104 to be displayed in UI 106 may be retrieved.

In 250, a plurality of states to be present in a rendering of the UI element are identified based on the plurality of test procedures, the metadata, and the data. For example, validator 124 may determine a set of values (based on metadata 110 and data 114) that should be visible in a particular data element 104 on UI 106. These desired or predicted values may be test states 128, and may be tested for using the set of test procedures 126 for the UI element 104.

In 260, a rendering of the UI element is validated against the plurality of states. For example, browser 122 may render UI 106 include a UI element 104. Validator 124 may then ping browser or perform OCR on UI 106 to determine whether the displayed values from UI 106 correspond to the expected or desired test states 128.

In 270, a test report is provided based on the validating. For example, based on whether the displayed or rendered data values across one or more rendered UI elements 104 in UI 106 match the test states 128, validator 124 may generate a report 130. Report 130 may be a text file or visual display of what tests were performed from test procedures 126, the expected test states 128, the actual rendered values from browser 122, and whether the test passed or failed. This report 130 may then be used to determine whether to modify the UI 106 or launch the UI 106 for an application 116.

FIG. 4A is a block diagram illustrating an example user interface 406, according to some embodiments. FIG. 4B is a block diagram illustrating an example test report 430, according to some embodiments. The test report 430 may be a partial test report of the testing that may have been performed on the user interface 406 by UTS 102.

User interface 406 may be a rendered UI 106 (from FIG. 1) that is generated, rendered, or displayed within a browser 122. In an embodiment, the entire table of UI 406 may be referred to as a single UI element 104, while in other embodiments, each column, row, or displayed data value may be evaluated as UI elements 104.

In an embodiment, UTS 102 may compare the metadata 110 (including annotations 112) to the actual displayed user interface 406 to determine whether the data 114 that was expected to be displayed (e.g., test states 128) is actually displayed in the user interface 406.

Test report 430 illustrates an example report 130, including example columns that provide test results and additional details about the test report 430. In other embodiments, different columns or visual formats for test report 430 may be used.

The test column may include an indication of which metadata 110 was tested, the result column may include a pass/fail result of the test, the expected value column may indicate a test state 128, and the notes column may indicate any notes that were detected, particularly with regard to a variance in case of failure.

The first two entries of test report 430 may include heading and sub-heading, which have passed, in that the expected values were actually detected in the displayed UI 406 (or UI element).

The first fail was in ID (was with regard to the book title "Think and Grow Rich", when the expected identification number for the book was 6339, but the actual displayed value was 20. The test report 430 may further indicate that the stock number failed, in that expected value was 20, and the actual displayed value was 6339. It may be quickly determined from test report 430 that the values for ID and stock (e.g., how many books are in stock) were inverted for a particular entry.

In an embodiment, the stock number may be an expected value less than 100 (if the bookstore does not carry more than 100 copies of any book), as such, test report 430 may include an expected value of <100 and an actual value of 6339. Similarly, ID may always be a 4 digit integer, and the ID of 20 may produce an error that expected value was a 4 digit integer, and actual value was "20".

With the Author failed test, the expected value was "J. K. Rowling" however no value was detected in the user interface 406. Based on test report 430, a test or data engineer may quickly identify what portions of the data 114 and/or metadata 110 may need to be reviewed or fixed. Or, the engineer may submit a bug report to another department that may identify how or where the errors occurred, and fix them before releasing the user interface 406. Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include customer input/output device(s) 303, such as monitors, keyboards, pointing devices, etc., which may communicate with communication infrastructure 306 through customer input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Figure 3:
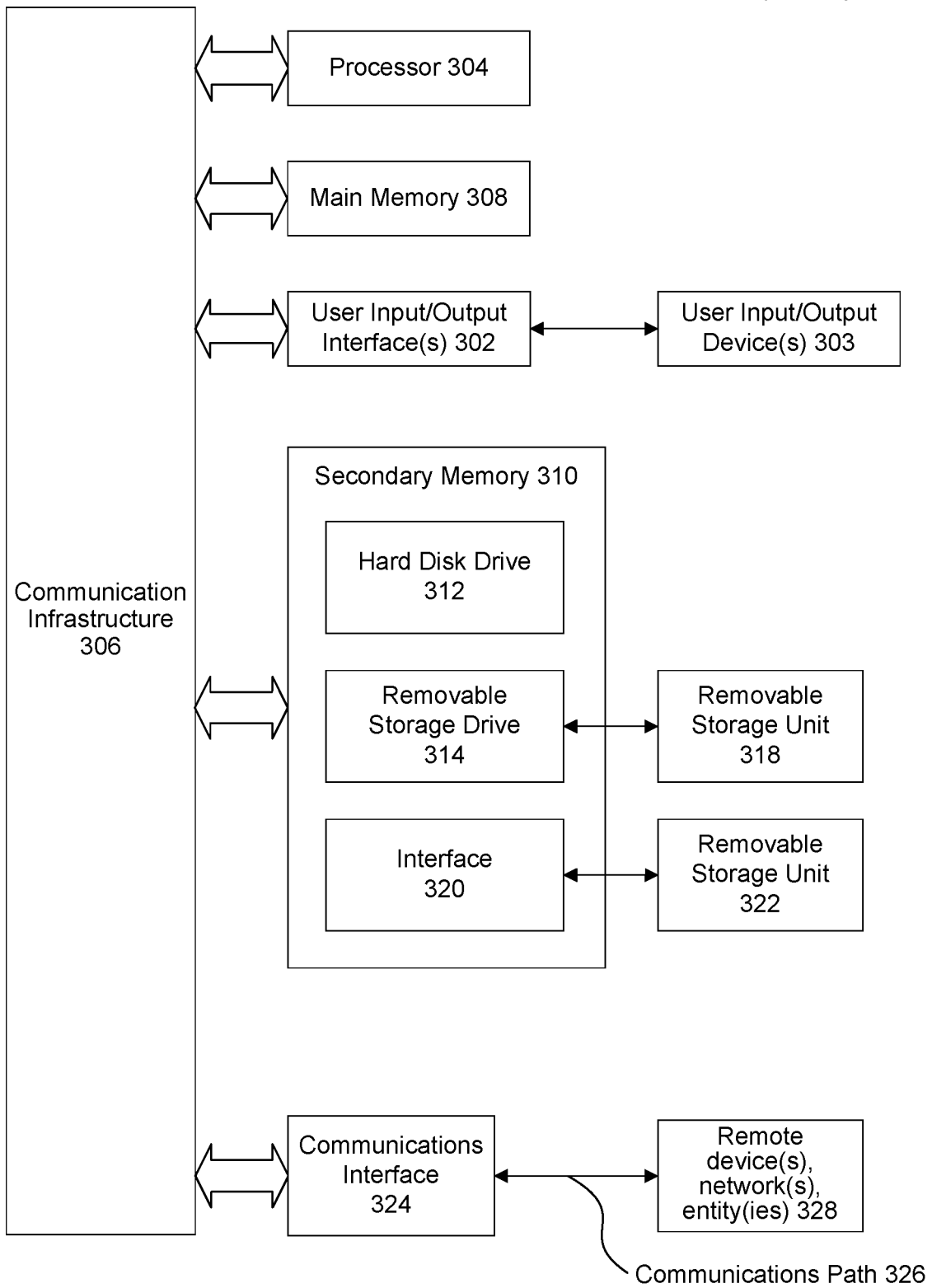
FIG. 3 is example computer system useful for implementing various embodiments.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
determining user interface (UI) settings, wherein the UI settings indicate a UI element to be rendered on a UI of an application;
determining metadata corresponding to the UI element, wherein the metadata indicates a format of data to be filled into the UI element;
fetching data to be filled corresponding to the metadata;
determining customized annotations associated with the UI element, the customized annotations indicating during which times of day which UI element is available to which of a subset of users;
identifying a plurality of test procedures corresponding to the UI element;
identifying a plurality of features indicated to be visible on a rendering of the UI element based on the customized annotations and the fetched data;
validating a rendering of the UI element against the plurality of states; and
providing a test report based on the validating the test report comprising: a first indication of the plurality of features identified to be visible based on the customized annotations and the fetched data, and a second indication of what features were identified on the rendering of the UI element based on the validating.

2. The method of claim 1, wherein the identifying comprises:
identifying the plurality of states based at least in part on the customized annotations.

3. The method of claim 1, further comprising:
generating a shell of the UI including the UI element based on the UI settings, the metadata, and the customized annotations.

4. The method of claim 3, further comprising:
generating the rendering of the UI element based on the shell and the fetched data.

5. The method of claim 4, further comprising:
displaying the rendering of the UI and the UI element, including the fetched data, in a browser.

6. The method of claim 1, wherein the test report indicates whether one or more attributes of the UI element and the fetched data as determined from the plurality of states were visible in the rendering of the UI.

7. The method of claim 1, wherein the customized annotations correspond to static and descriptive information.

8. The method of claim 1, wherein the customized annotations correspond to dynamic information, the dynamic information being used to am an open data protocol service.

9. The method of claim 1, wherein the customized annotations indicate a first subset of users to which UI element is available, wherein the UI element is unavailable to a second subset of users.

10. The method of claim 1, wherein the validating comprises performing an optical character recognition (OCR) on at least a portion of the rendering of the UI corresponding to the plurality of features and in accordance with the test procedures.

11. The method of claim 1, wherein the validating comprises pinging a browser to determine whether the rendering comprises the UI element.

12. A system comprising:
a memory; and
at least one processor coupled to the memory and configured to perform operations comprising:
determining user interface (UI) settings, wherein the UI settings indicate a UI element to be rendered on a UI of an application;
determining metadata corresponding to the UI element, wherein the metadata indicates a format of data to be filled into the UI element;
fetching data to be filled corresponding to the metadata;
determining customized annotations associated with the UI element, the customized annotations indicating during which times of day which UI element is available to which of a subset of users;
identifying a plurality of test procedures corresponding to the UI element;
identifying a plurality of features indicated to be visible on a rendering of the UI element based on the customized annotations and the fetched data;
validating a rendering of the UI element against the plurality of states; and
providing a test report based on the validating, the test report comprising: a first indication of the plurality of features identified to be visible based on the customized annotations and the fetched data, and a second indication of what features were identified on the rendering of the UI element based on the validating.

13. The system of claim 12, wherein the identifying comprises:
identifying the plurality of states based at least in part on the customized annotations.

14. The system of claim 12, the operations further comprising:
generating a shell of the UI including the UI element based on the UI settings, the metadata, and the customized annotations.

15. The system of claim 14, the operations further comprising:
generating the rendering of the UI element based on the shell and the fetched data.

16. The system of claim 15, the operations further comprising:
displaying the rendering of the UI and the UI element, including the fetched data, in a browser.

17. The system of claim 12, wherein the test report indicates whether one or more attributes of the UI element and the fetched data as determined from the plurality of states were visible in the rendering of the UI.

18. A non-transitory computer-readable device having instructions stored thereon that, when executed by at least one computing device, cause the at least one computing device to perform operations comprising:
determining user interface (UI) settings, wherein the UI settings indicate a UI element to be rendered on a UI of an application;
determining metadata corresponding to the UI element, wherein the metadata indicates a format of data to be filled into the UI element;
fetching data to be filled corresponding to the metadata;
determining customized annotations associated with the UI element, the customized annotations indicating during which times of day which UI element is available to which of a subset of users;
identifying a plurality of test procedures corresponding to the UI element;
identifying a plurality of features indicated to be visible on a rendering of the UI element based on the customized annotations and the fetched data;
validating a rendering of the UI element against the plurality of states; and
providing a test report based on the validating, the test report comprising: a first indication of the plurality of features identified to be visible based on the customized annotations and the fetched data, and a second indication of what features were identified on the rendering of the UI element based on the validating.

19. The device of claim 18, wherein the identifying comprises:
identifying the plurality of states based at least in part on the customized annotations.

20. The device of claim 18, the operations further comprising:
generating a shell of the UI including the UI element based on the UI settings, the metadata, and the customized annotations.

* * * * *